United States Patent [19]
Nakanishi

[11] Patent Number: 5,803,567
[45] Date of Patent: Sep. 8, 1998

[54] PROTECTION-TYPE DISPLAY DEVICE

[75] Inventor: Yasuaki Nakanishi, Tokyo, Japan

[73] Assignee: Sony Corporation, Tokyo, Japan

[21] Appl. No.: 733,925

[22] Filed: Oct. 18, 1996

[30] Foreign Application Priority Data

Oct. 30, 1995 [JP] Japan .................................. 7-303354

[51] Int. Cl.⁶ .................................................. G03B 21/14
[52] U.S. Cl. ............................ 353/74; 353/38; 359/457
[58] Field of Search ............................ 353/38, 74, 76, 353/77, 78; 359/455, 456, 457, 460

[56] References Cited

U.S. PATENT DOCUMENTS

| | | | |
|---|---|---|---|
| 4,725,134 | 2/1988 | Ogino | 353/74 |
| 4,773,731 | 9/1988 | Goldenberg et al. | 359/457 |
| 4,961,642 | 10/1990 | Ogiuo | 353/38 |
| 5,184,224 | 2/1993 | Mitani et al. | 359/456 |
| 5,208,620 | 5/1993 | Mitsutake et al. | 353/74 |
| 5,485,308 | 1/1996 | Hirata et al. | 359/457 |
| 5,513,036 | 4/1996 | Watanabe et al. | 359/456 |
| 5,581,407 | 12/1996 | Mitani et al. | 359/456 |

*Primary Examiner*—William Dowling
*Attorney, Agent, or Firm*—Jay H. Maioli

[57] ABSTRACT

A projection-type display device includes an image projector and a screen, in which image projector is for projecting image light rays and the screen is disposed on a side to which the image light rays are projected from the image projector. The screen is formed of a Fresnel lens sheet with one side thereof facing the image projector and a lenticular sheet disposed on the other side of the Fresnel lens sheet for transmitting the image light rays that are formed into a picture on the screen. The Fresnel lens sheet has a fixed focal length in a region from the center of the Fresnel lens sheet to a prescribed distance and focal lengths gradually decreasing toward the outer periphery of the Fresnel lens sheet in a region exceeding the prescribed distance.

18 Claims, 10 Drawing Sheets

FIG. 5

| distance from center of screen (mm) | distance from center of screen of positions of occurrence of double-imaging | | | |
|---|---|---|---|---|
| | case 1<br>a=950<br>b=6000<br>f=820 | case 2<br>a=800<br>b=6000<br>f=706 | case 3<br>a=700<br>b=6000<br>f=627 | case 4<br>a=700<br>b=-8000<br>f=767 |
| 180 | doesn't appear | doesn't appear | doesn't appear | doesn't appear |
| 190 | doesn't appear | doesn't appear | doesn't appear | doesn't appear |
| 200 | doesn't appear | doesn't appear | 195 | doesn't appear |
| 210 | doesn't appear | doesn't appear | 204 | doesn't appear |
| 220 | doesn't appear | 215 | 214 | doesn't appear |
| 230 | doesn't appear | 225 | 224 | doesn't appear |
| 240 | doesn't appear | 234 | 233 | doesn't appear |
| 250 | doesn't appear | 244 | 242 | doesn't appear |
| 260 | 255 | 253 | 252 | 255 |
| 270 | 264 | 263 | 261 | 265 |

FIG. 11

| distance from center of screen (mm) | distance from center of screen of positions of occurrence of double-imaging | | |
|---|---|---|---|
| | case 3<br>a=700<br>b=6000<br>f=627 | case 4<br>a=700<br>b=-8000<br>f=767 | this embodiment<br>a=700<br>b=-7300~6064<br>f=774~628 |
| 180 | doesn't appear | doesn't appear | doesn't appear |
| 190 | doesn't appear | doesn't appear | doesn't appear |
| 200 | 195 | doesn't appear | doesn't appear |
| 210 | 204 | doesn't appear | doesn't appear |
| 220 | 214 | doesn't appear | doesn't appear |
| 230 | 224 | doesn't appear | doesn't appear |
| 240 | 233 | doesn't appear | doesn't appear |
| 250 | 242 | doesn't appear | doesn't appear |
| 260 | 252 | 255 | 255 |
| 270 | 261 | 265 | 265 |

FIG. 12

| distance from center of screen | luminance ratio with respect to center of screen | | |
|---|---|---|---|
| | case 3 | case 4 | this embodiment |
| | a=700<br>b=6000<br>f=627 | a=700<br>b=-8000<br>f=767 | a=700<br>b=-7300~6064<br>f=774~628 |
| 200 | 80 | 75 | 74 |
| 300 | 60 | 50 | 53 |
| 400 | 45 | 30 | 40 |
| 510 | 35 | 15 | 35 |

PROTECTION-TYPE DISPLAY DEVICE

FIELD OF THE INVENTION

The present invention relates to a rear-projection system display device for reproducing an image formed by, for example, a Cathode Ray Tube (hereinafter referred to as a "CRT") or a liquid crystal panel on a transmission screen, and more particularly relates to a projection-type display device configured so as to have a short projection distance from projection lens to screen.

BACKGROUND OF THE INVENTION

Recently there has been a general proliferation of projection-type display devices such as projection televisions which facilitate the enjoyment of big screen viewing by projecting an image on a screen. Devices in which a rear-projection system is used to project image light rays from the back of the transmission screen comprising the display unit for viewing the image on the screen are well known as such projection-type display devices.

FIG. 1 shows a schematic configuration of a rear-projection system display device.

A CRT 22 as an image source for projecting the image light rays for each of the primary colors red (R), green (G) and blue (B) (actually three CRTs 22R, 22G and 22B having a predetermined angle for projecting each of the primary colors R, G and B, are placed side by side) is housed in the bottom of the main body of the display device. Three primary color image light rays outputted from the CRTs 22 (R, G and B) and enlarged by projection lenses 23 (R, G and B) corresponding to each of the primary colors placed in front of the CRTs, are reflected by a reflector 24 onto the back of a transmission screen 25.

As a result, the RGB image light rays are combined to form a color image on the transmission screen 25 which the viewer sees from the front.

A transparent panel 33 made of an acrylic resin such as, for example, methacrylic resin is placed on the front of the transmission screen 25 to protect the transmission screen 25 and enhance the luster of the displayed image.

FIG. 2 is an enlarged view of a disassembled portion of the transmission screen 25 and transparent panel 33.

The transmission screen 25 comprises, for example, a Fresnel lens sheet 26 made of an acrylic resin such as methacrylic resin and a lenticular sheet 31 for receiving incident RGB image light rays from the direction indicated by arrow A.

The Fresnel lens sheet 26 is configured to prevent divergence of the image light rays projected from the projection lens 23 shown in FIG. 1 and to condense this light for the viewer. To make the lens thin, the lens unit consists of many arcuate lens elements arranged concentrically about the center of the lens. This enables a thin lens of large diameter to be constructed.

The lenticular sheet 31 placed behind the Fresnel lens sheet 26 is formed mainly to enable a wider horizontal viewing angle through the horizontal dispersal and emission of the image. Vertical black stripes 32 are formed at prescribed intervals on the emission side of the lenticular sheet 31 to alleviate the reduction in contrast caused by extraneous light.

Recently, in order to reduce the size of display equipment housings, the use of a short focal length projection lens to reduce the projection distance between projection lens and screen has been considered.

However, when the display device is configured with a short projection distance, as is described in the following, there is a problem with reduced picture quality due to double imaging caused by interface reflection within the Fresnel lens sheet 26.

A description of an example of the path of a beam of light falling upon a Fresnel lens sheet 26 is given in the following.

FIG. 3 is a view showing a cross section of an area of the Fresnel lens sheet 26 about 220 mm below the center of the Fresnel lens sheet 26 and the path of a beam of light falling upon the Fresnel lens sheet 26 in this place and in this example, taking the distance from the projection lens 23 to the Fresnel lens sheet 26 to be 950 mm, the condensing length of the Fresnel lens sheet 26 to be 6000 mm and the refractive index to be 1.552.

In FIG. 3, the lens elements 27 comprising the Fresnel lens sheet 26 are taken to have an angle of inclination T0a of 26.1° and a rise angle T1a of 1°.

An image light ray La1 emitted from the projection lens 23 falls on the plane of incidence 28 of the Fresnel lens sheet 26 at an angle of incidence T2a=13.0° and is refracted. The image light ray La1 then falls upon a lens surface 29 at an angle of incidence T3a=17.7° and is emitted as an outgoing beam La2 with an angle of refraction T4a=2.120 . At this time, part of the image light ray La1 is reflected by the lens surface 29 and is returned to the plane of incidence 28 as reflected light beams La3 and La4.

The reflected light beam La3 falls upon the plane of incidence 28 of the Fresnel lens sheet 26 at an angle of incidence T5a=43.8° and is completely reflected and returned to a lens surface 29 so as to fall on a non-lens surface 30 at an angle of incidence T6a=45.3°. Then, after being completely reflected, the light falls upon the lens surface 29 at an angle of incidence T7a=18.7° and is refracted and emitted downwards at an outgoing angle T8a=55.9°. Since a case of observation from below the bottom of the picture is extremely rare, the problem of seeing this light as a double image is almost non-existent.

On the other hand, another reflected light beam La4, after being completely reflected by the plane of incidence 28 of the Fresnel lens sheet 26, falls on the lens surface 29 and is completely reflected at an angle of incidence T9a=69.9°. After this, the light is emitted from the non-lens surface 30, but as this direction is almost parallel with the plane of incidence 28, this light falls again on the Fresnel lens sheet 26 from the lens surface 29 and cannot be seen as a double image.

However, as previously mentioned, with a display device having a projection lens 23 with a short focal length, since the angle of incidence with respect to the Fresnel lens sheet 26 and the angle of inclination of the lens unit has increased, double imaging occurs readily as described in FIG. 4.

FIG. 4 shows an example of a case where the distance from the projection lens 23 to the Fresnel lens sheet 26 is shortened to 700 mm and the condensing length and refractive index of the Fresnel lens sheet 26 are the same as the case described in FIG. 3.

In this description, a "b" has been added to the symbol for each part of the Fresnel lens sheet 26.

In the case shown in FIG. 4, the lens units 27b of the Fresnel lens sheet 26b are taken to have an angle of inclination T0b of, for example, 32.7° which is larger than T0a and with the rise angle T1b being unchanged at, for example, 1°.

An image light ray Lb1 emitted from the projection lens 23b falls on the plane of incidence 28b of the Fresnel lens sheet 26b at an angle of incidence T2b=17.4° which is larger than T2a and is refracted, then falls upon a lens surface 29b at an angle of incidence T3b=21.6°. Then, after refraction, the light becomes an outgoing beam Lb2 with an outgoing angle T4b =2.1°.

At this time, a part of the image light ray Lb1 is reflected by the lens surface 29b and is returned to the plane of incidence 28b as reflected light beams Lb3 and Lb4.

The reflected light Lb3 returns to the plane of incidence 28b at an angle of incidence T5b=54.3° which is larger than T5a and is completely reflected so as to fall on a non-lens surface 30b at an angle of incidence T6b=34.7°. Then, without any reflection at all, the light is emitted as an outgoing beam Lb5 with an outgoing angle T8b=26.9°. Light emitted at this outgoing angle can then easily be viewed by eye.

In this case, the spacing "d" between the outgoing beam Lb2 which is the normal image-forming light and outgoing beam Lb5 which comes from the reflected light Lb3, can be obtained from $$d=2 \times t \times \tan(T5b)$$

where "t" is the thickness of the Fresnel lens sheet 26b (the length of the non-lens surface is small when compared with the plate thickness t, and the rise angle is small at 1°, and these can therefore be ignored).

In the case of the example shown in FIG. 4, if the thickness "t" is taken, for example, to be about 2 mm, the beam spacing d becomes, for example, about 5.6 mm and double imaging becomes noticeable in the normal image at a spacing of about, for example, 5.6 mm. Therefore, the drop in picture quality becomes particularly noticeable when telops or movie sub-titles are displayed at the bottom of the picture.

Also, after being completely reflected by the plane of incidence 28b at the back of the Fresnel lens sheet 26b, another reflected beam Lb4 falls on a lens surface 29b at an angle of incidence T9b=87.0° and is completely reflected to fall on a non-lens surface 30b at an angle of incidence T10b=28.7°. In this case also, the incident light is not reflected at all. Then, after being refracted, the light is emitted as an outgoing beam Lb6 at an outgoing angle T11b=40.8° and will be noticed as a double image together with outgoing beam Lb5.

FIG. 4 dealt with the description of a case of noticeable double imaging below the center of the Fresnel lens sheet 26b. However, the shape of the lens is symmetrical in relation to the center and similar double imaging will also therefore be noticed from the center in the upper area.

This double imaging is not a particular problem with respect to the areas to the left and right because of absorption by the black stripes 32 formed on the emission side of the lenticular sheet 31 in the stage following the Fresnel lens sheet 26b.

FIG. 5 shows a table of cases of measured positions of double imaging (outgoing beams Lb5 and Lb6) for various distances "a" (mm) from the projection lens 23 to the Fresnel lens sheet 26, condensing length "b" (mm) on the viewing side and focal lengths "f" (mm) of the Fresnel lens sheet 26. The thickness of the Fresnel lens sheet 26 was 2 mm and the refractive index was 1.552.

In the case of a display device with a 40-inch screen having an aspect ratio of 4:3, the picture will be 610 mm high. Then, as described in FIG. 3, in Case 1 where the light path from the projection lens 23 to the Fresnel lens sheet 26 is set at about 950 mm, there will be no double imaging in the image displayed at a position about 250 mm away from the center of the Fresnel lens sheet 26. Also, the image displayed at a position about 260 mm from the center will appear as a double image at about 255 mm but, since this is almost at the edge of the picture, it is not a particular problem for the image.

However, as shown in Case 2 and Case 3, the appearance of double imaging occurs readily when the light path distance "a" between the projection lens 23 and the Fresnel lens sheet 26, and the focal length "f", are made shorter.

As shown in Case 2 for example, when the light path distance is set to a=about 800 mm, at a position separated from the center by 220 mm or more, double imaging tends to be displayed at a position from about 5 mm to 7 mm towards the center from the original image.

Moreover, as shown in Case 3, where an even shorter light path distance of a=700 mm is set, double imaging appears in the displayed image at a position about 200 mm away from the center.

In other words, in Case 3, double imaging occurs at a position about $2/3$ of the distance from the center of the Fresnel lens sheet 26 and, as mentioned above, the quality of the image at a position away from the center of the picture, such as at the position of movie subtitles, is rather poor.

On this point, the occurrence of double imaging can be suppressed to the same as that shown in Case 1 where the light path distance "a" is long if the angle of inclination of the lens units 27 is made smaller and, as shown in Case 4, the condensing length "b" on the viewing side is −8000 mm, i.e., if the angle of incidence of the Fresnel lens sheet 26 lens units 27 were to be made so small that the light beam emitted from the Fresnel lens sheet 26 is made divergent. However, the essential function of the Fresnel lens sheet 26 would then be defeated, with luminance in the peripheral portions of the picture reduced and the image becoming dark.

FIG. 6 is a graph showing the outgoing angles of light beams from the projection lens 23 emerging from various points on the Fresnel lens sheet 26 in directions towards the center with regards to Case 3 in FIG. 5. Similarly, FIG. 7 applies to Case 4 and is a graph showing the outgoing angles of light beams from the projection lens 23 emerging from various points on the Fresnel lens sheet 26. In these graphs, the vertical axes show the outgoing angles (deg) and the horizontal axes show distances (mm) from the center of the Fresnel lens sheet 26.

As shown in FIG. 6, in Case 3 the outgoing angle (deg) towards the center increases in accordance with the distance from the center and since the outgoing beam is emitted towards the center, the image tends to be condensed towards the viewer. However, as shown in FIG. 7, in Case 4, since the outgoing angle towards the center (deg) becomes more negative in accordance with the distance from the center, the outgoing beam becomes more diffused with distance from the center and is directed to the outside. This causes the previously mentioned reduction of luminance in the peripheral parts of the picture.

As described above, in a display device where the light path distance from the projection lens 23 to the transparent screen 25 has been made short, the image light ray is concentrated in the direction of the observer but, on the other hand, double imaging occurs at a position $2/3$ of the distance from the center of the picture. If the angle of inclination of the lens elements 27 of the Fresnel lens sheet 26 is made small in order to suppress this, the luminance in the peripheral parts of the image is reduced and it therefore becomes difficult to obtain a good image.

SUMMARY OF THE INVENTION

As the present invention sets out to resolve these kinds of problems, a projection-type display device comprises an image projector and a screen. The image projector is for projecting image light rays.

The screen is disposed on a side to which the image light rays are projected and comprises a Fresnel lens sheet with one side thereof facing the image projector and a lenticular sheet disposed on the other side of the Fresnel lens sheet for transmitting the image light rays that are formed into a picture on the screen.

The Fresnel lens sheet has a fixed focal length in a region from the center of the Fresnel lens sheet to a prescribed distance and focal lengths gradually decreasing toward the outer periphery of the Fresnel lens sheet in a region exceeding the prescribed distance.

The prescribed distance is at least one of a distance from the center of the Fresnel lens sheet to a point corresponding to an upper edge of a projected image on the Fresnel lens sheet and a distance from said center of the Fresnel lens sheet to a point corresponding to a lower edge of the projected image on the Fresnel lens sheet.

The Fresnel lens sheet can also be made to have focal lengths gradually decreasing from its center toward its outer periphery depending on the conditions of the Fresnel lens sheet or the characteristics of the projection system.

Further, a projection apparatus comprises a housing, a screen, a reflector, an image source and a projection lens. The screen comprises a Fresnel lens sheet and a lenticular sheet and is disposed at a front of the housing. The reflector is disposed at the inside rear of the housing.

The Fresnel lens sheet has a fixed focal length in a region from the center of the Fresnel lens sheet to a prescribed distance and focal lengths gradually decreasing toward the outer periphery of the Fresnel lens sheet in a region exceeding the prescribed distance.

The prescribed distance is at least one of a distance from the center of the Fresnel lens sheet to a point corresponding to an upper edge of a projected image on the Fresnel lens sheet and a distance from the center of the Fresnel lens sheet to a point corresponding to a lower edge of the projected image on the Fresnel lens sheet.

The Fresnel lens sheet can also be made to have focal lengths gradually decreasing from its center toward its outer periphery depending on the conditions of the Fresnel lens sheet or the characteristics of the projection system.

The image source can comprise a cathode ray tube or three cathode ray tubes respectively corresponding to a red signal, a green signal and a blue signal. The image source can also comprise a liquid crystal panel or three liquid crystal panels respectively corresponding to a red signal, a green signal and a blue signal.

Moreover, the lenticular sheet can be made to have vertical black stripes thereon at intervals.

Since the present invention is able to suppress double imaging appearing towards the periphery of the picture and suppress drops in luminance at the periphery, a better image can be provided than in the related art.

BRIEF DESCRIPTION OF THE DRAWINGS

FIG. 5 is a table of measured values of double imaging;

FIG. 11 is a view showing an example of measurements of double imaging when the Fresnel lens sheet of this embodiment is used;

FIG. 12 is a view showing an example of measurements of peripheral luminance when the Fresnel lens sheet of this embodiment is used.

DETAILED DESCRIPTION OF THE PREFERRED EMBODIMENT

The following is a description with reference to the drawings of an embodiment of a projection-type display device of the present invention.

Figure 8:
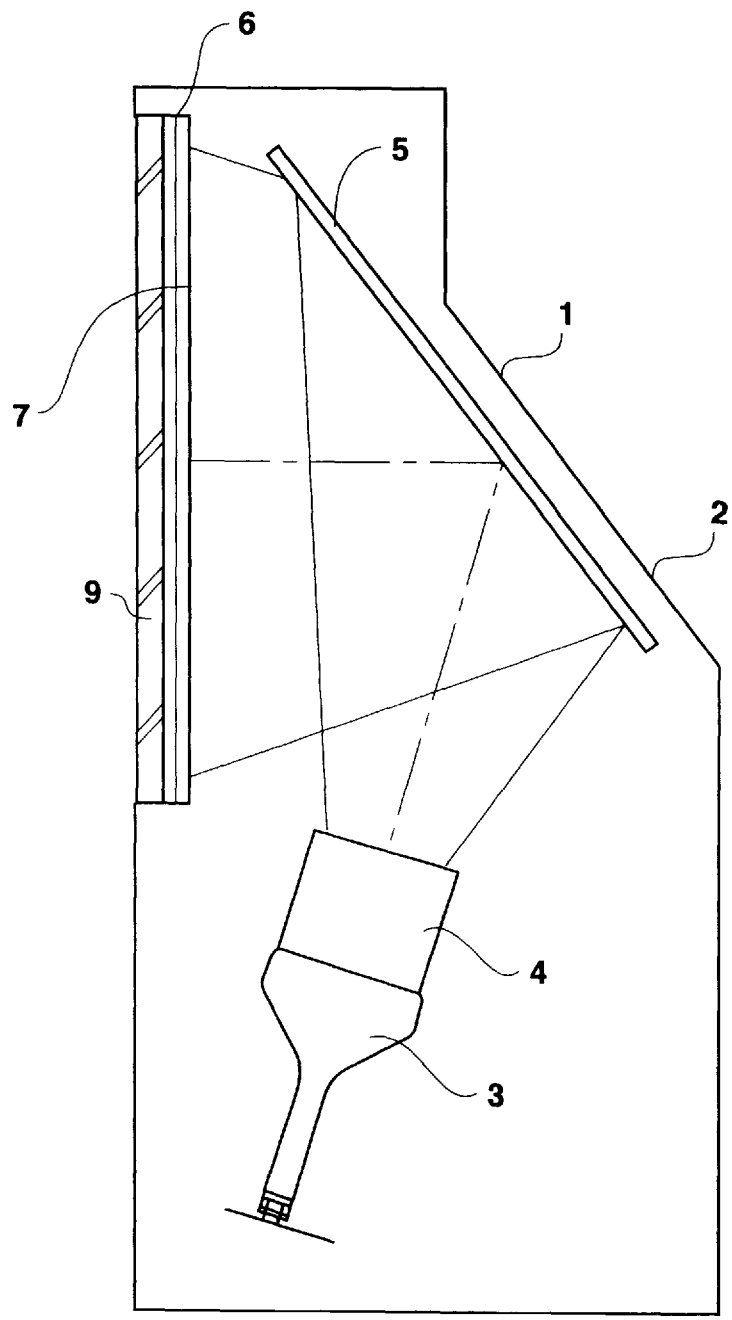
FIG. 8 is a schematic view of a configuration of the projector device of an embodiment of the present invention.

FIG. 8 is an outline side-view of a configuration of a projector taken as the embodiment.

A projector 1 of the embodiment houses a CRT 3 as an image source for projecting image light rays for each of the primary colors red (R), green (G) and blue (B) (actually three CRTs 3R, 3G and 3B corresponding to each of the primary colors R, G and B having a predetermined angle are placed side by side) in the bottom of a housing 2. Three primary color light images output from the CRTs 3 (R, G and B), enlarged by projection lenses 4 (R, G and B) corresponding to each of the primary colors placed in front of the CRTs, are reflected by a reflector 5 onto the back of a transmission screen 6.

Figure 1:
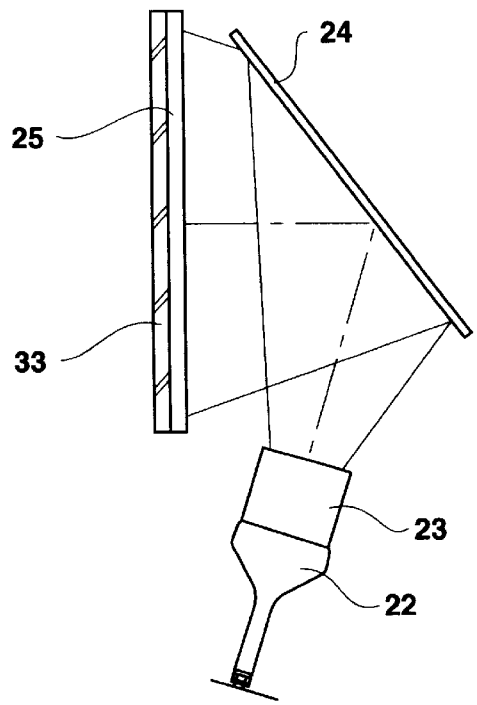
FIG. 1 is a view showing an example of the outline of a configuration for a projector device of the related art.
Figure 2:
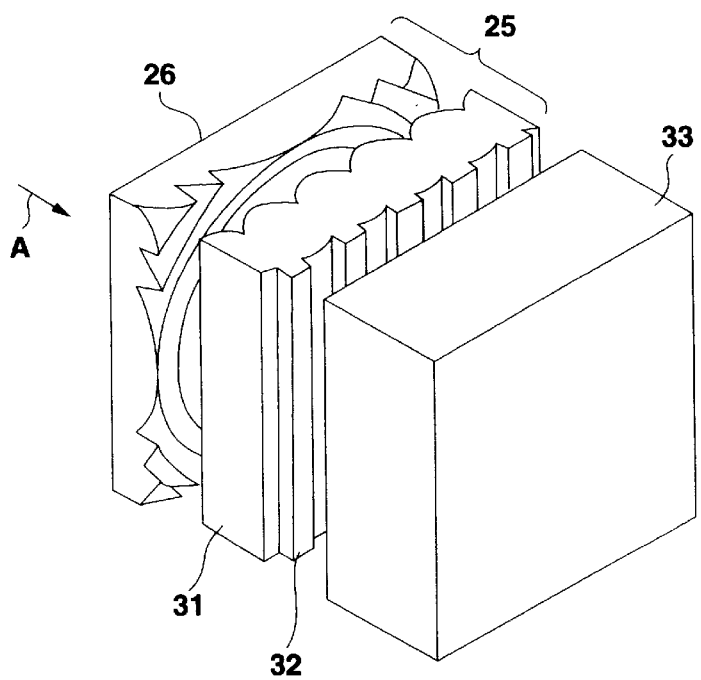
FIG. 2 is a perspective view showing a breakdown of a portion of the transmission screen and transparent panel of FIG. 1.
Figure 3:
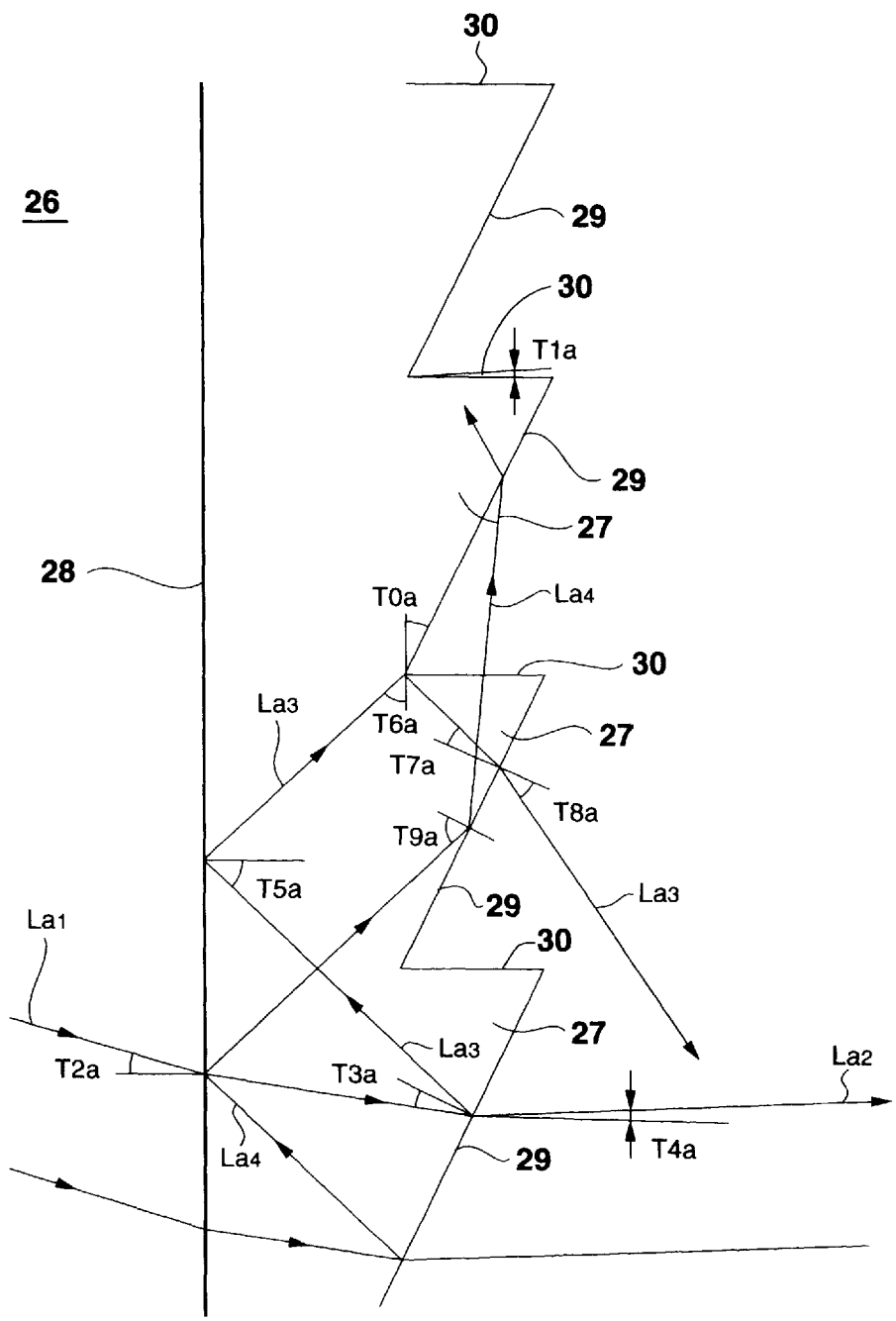
FIG. 3 is a cross-section of part of the Fresnel lens sheet in FIG. 2 about 220 mm below the center showing the paths of light beams falling on the Fresnel lens sheet.
Figure 4:
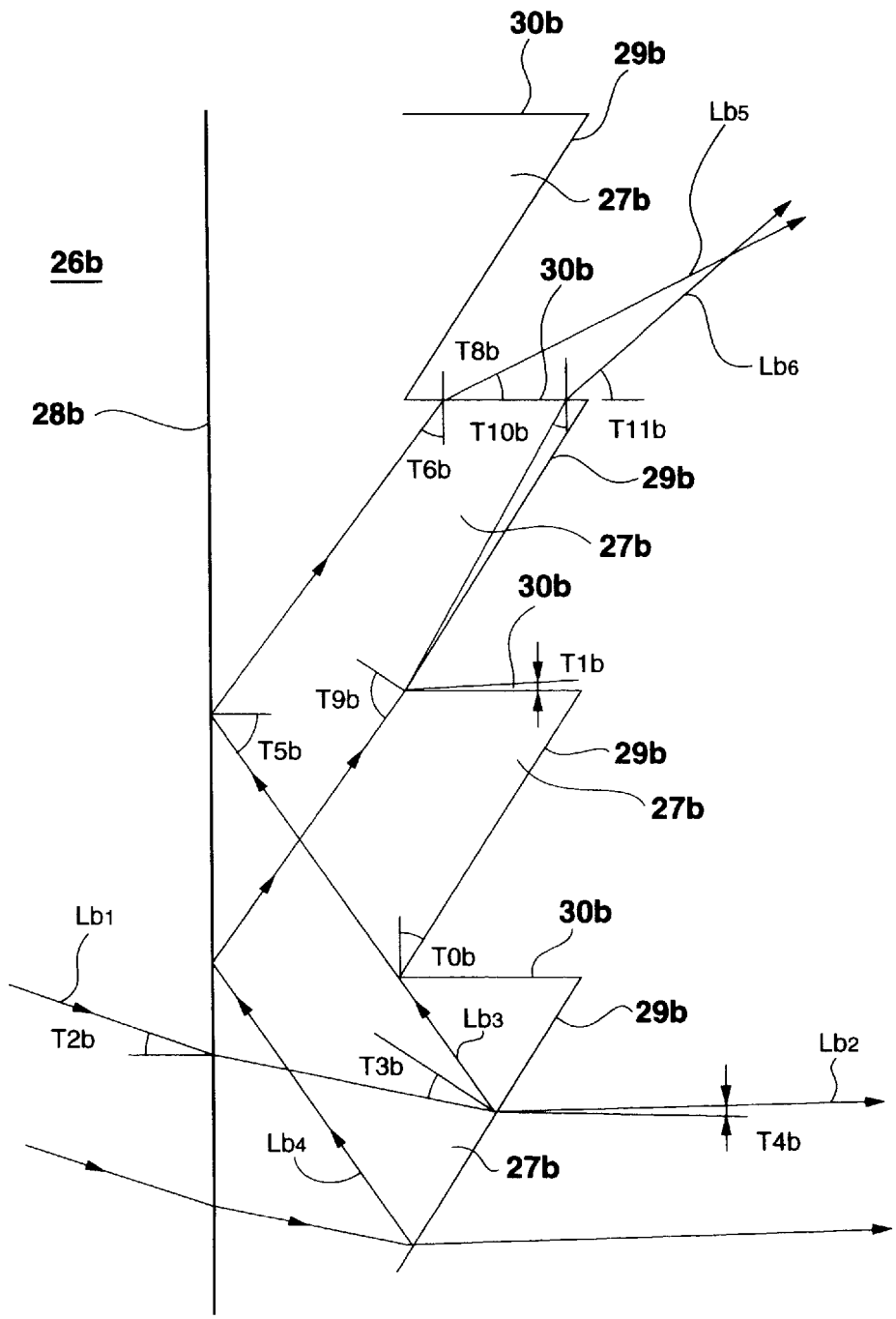
FIG. 4 is a view showing an example of the paths of light beams falling on a Fresnel lens sheet at about 220 mm below the center when double imaging appears.

The transmission screen 6 consists of a Fresnel lens sheet 7 and a lenticular sheet 8 configured to form an image from image light rays inputted for each of the primary colors from the CRTs (R, G and B) via the reflector 5. In the present invention, as described later, the focal lengths of the lens elements comprising Fresnel lens sheet 7 are arranged to change gradually in accordance with the distance from the center. Also, the lenticular sheet 8 has black stripes similar to the conventional example shown in FIG. 2.

The Fresnel lens sheet 7 causes the light reflected by the reflector 5 to converge, the light becomes incident to the lenticular sheet 8, and is then dispersed horizontally and emitted by the lenticular sheet 8. In this way, the RGB light images are combined to form a color image on the transmission screen 6 which the viewer sees from in front of the screen 6.

A transparent panel 9 made of an acrylic resin such as methacrylic resin for example is placed on the front of the transmission screen 6 to protect the transmission screen 6 and enhance the luster of displayed images.

Figure 9:
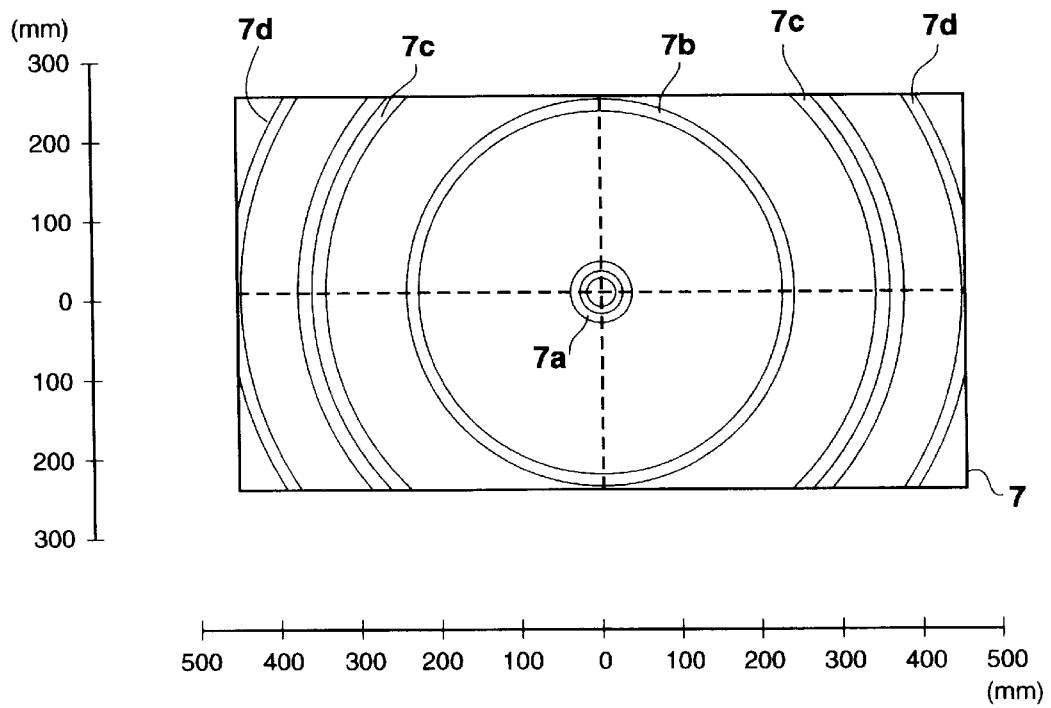
FIG. 9 is a plan view of the Fresnel lens sheet in this embodiment.

FIG. 9 is a plan view of the Fresnel lens sheet 7.

Concentric lens elements 7a, 7b, 7c, 7d . . . are formed on this Fresnel lens sheet 7 (although intermediate portions of these lens elements are omitted by only being shown by broken lines, in reality, a large number of concentric rings of lens elements are also shown at the broken line portions). In this embodiment, the focal length of each lens element is set to a constant value from lens element 7a at the center to lens element 7b (200 mm from the center for instance) and to a gradually shorter value from lens element 7b to lens element 7d, i.e. to the outside of the Fresnel lens sheet 7. A detailed description of setting these focal lengths is given below in FIG. 10.

Figure 10:
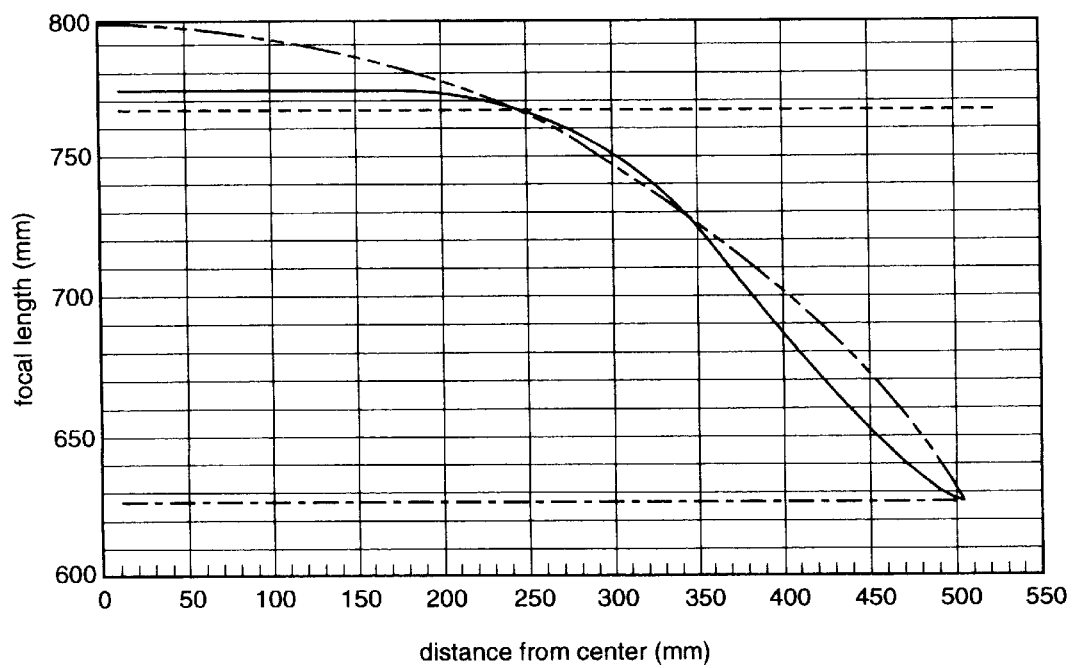
FIG. 10 is a graph showing the relationship between distance from the center of the Fresnel lens sheet of this embodiment and the focal length corresponding to that distance.

FIG. 10 is a graph showing the relationship between the distance from the center of the Fresnel lens sheet 7 and the focal length of the lens element in relation to this distance, the horizontal axis showing the distance (mm) from the center and the vertical axis showing the focal length.

The distance of the Fresnel lens sheet 7 from the projection lenses 4 is 700 mm and the refractive index of each lens element of the Fresnel lens sheet 7 is 1.55.

In FIG. 10, the dashed and two-dotted line indicates an example of the focal length (f=627 mm) of each lens element in the case where prominent double imaging occurs towards the edge of the image as described previously for Case 3 in FIG. 5, and the broken line indicates an example having a long focal length (f=767 mm) for each lens element in the case where luminance decreases due to suppression of double imaging, as described for Case 4 of FIG. 5.

In this embodiment, the focal length f for each lens element as shown by the solid line is arranged to be almost constant from the center to 200 or 250 mm and to become gradually shorter towards the outer edge.

Setting a constant focal length of f=767 mm from the center to 200 or 250 mm enables the occurrence of double imaging to be suppressed almost to the upper and lower edges which are at 200 to 250 mm from the center of the Fresnel lens sheet 7 shown in FIG. 9, and to the left and right.

Also, since double imaging at the region to the left and right from 200 to 250 mm from the center is absorbed by the black stripes of the lenticular sheet 8 in the stage after the Fresnel lens sheet 7, this will not appear on the screen even if the focal length f of the lens elements is made short. Consequently, as shown in the drawings, the focal length f of each of the lens elements can be made gradually shorter and the decreased luminance in the peripheral parts of the image can be suppressed by setting the focal length f so that the condensing length b becomes, for example, 6 m beyond the region about 200 to 250 mm from the center of the Fresnel lens sheet 7.

Next, a description is given of an example of the results for a design to achieve the focal length f (solid line) of the Fresnel lens sheet 7 in this embodiment which was described in FIG. 10.

In a general numerical expression for the configuration of a non-spherical lens:

$$Z = \frac{CH^2}{1 + \sqrt{1 - (K+1)C^2H^2}} + \sum_{i=2}^{5} AiH^{2i}$$

where Z=sag, H=distance from the center of the Fresnel lens sheet 7, K=conic constant, C=optical axis curvature and A2 to A5=coefficients to be optimized as constants after performing case work.

In this embodiment, by setting the conic constant K=−1, optical axis curvature C=−0.00234, A2=0, A3=0, A4=−1.91×10$^{-20}$ and A5=4.43×10$^{-26}$, it was possible to configure the desired shape to achieve the characteristics shown by the solid line in FIG. 10.

Below is a description of an example of double imaging measurements and peripheral luminance using the Fresnel lens sheet 7 of this embodiment.

Figure 6:
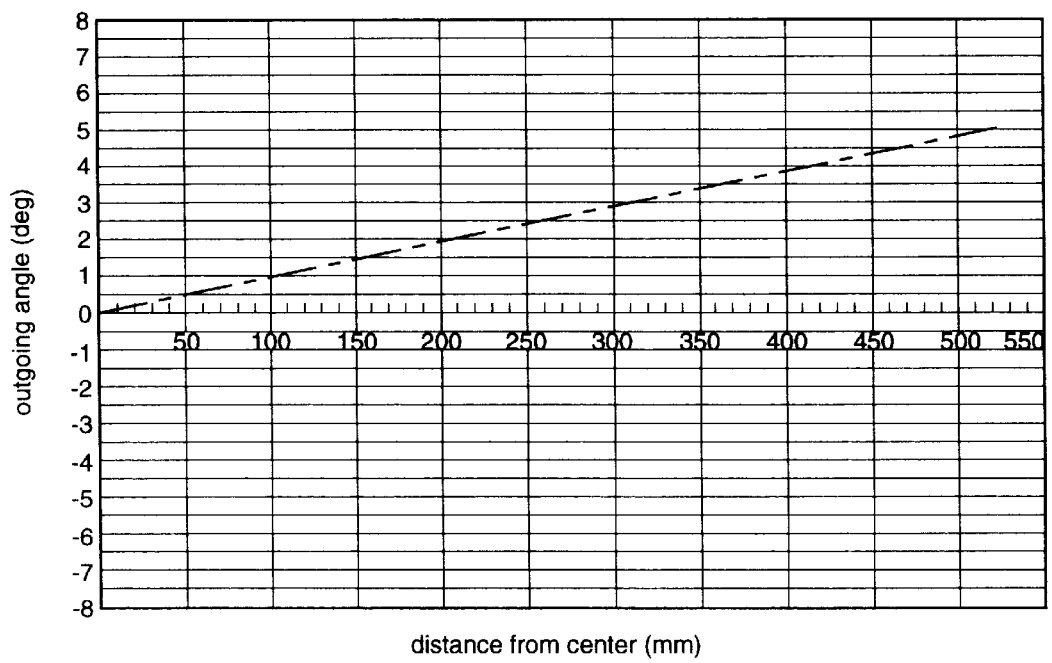
FIG. 6 is a view of outgoing angles of light beams emitted from each point on the Fresnel lens sheet for Case 3 shown in the table of FIG. 5.
Figure 7:
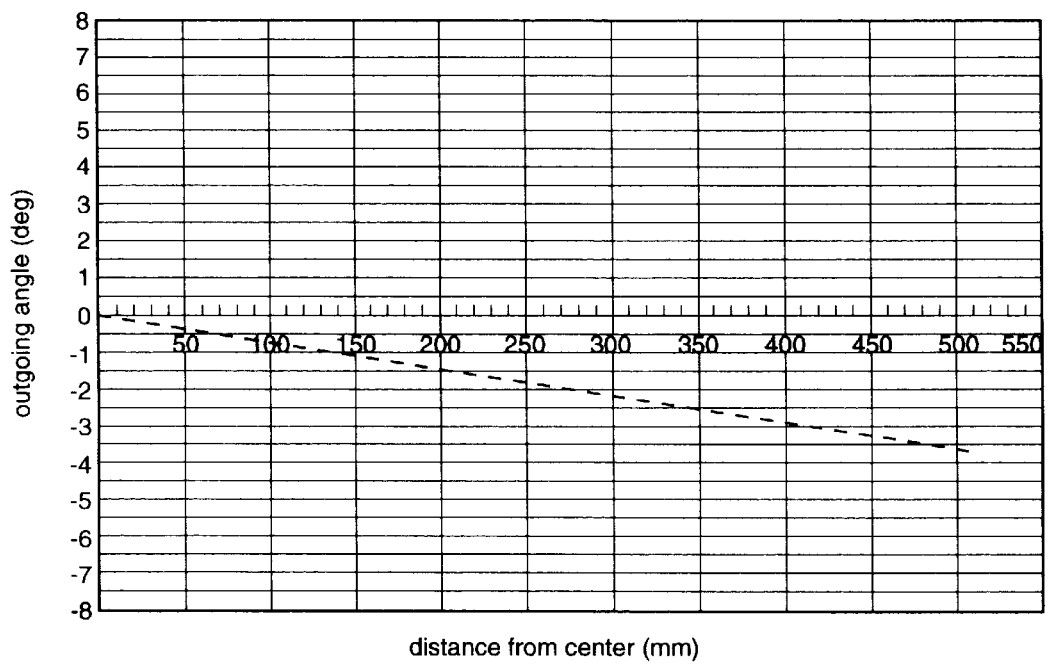
FIG. 7 is a view of outgoing angles of light beams emitted from each point on the Fresnel lens sheet for Case 4 shown in the table of FIG. 5.

FIG. 11 is a table showing an example of measured values of double imaging using the Fresnel lens sheet 7 of this embodiment and measured values occurring in Case 3 and Case 4 previously shown in FIG. 6. In this embodiment, the condensing length b varies between −7300 mm and 6064 mm from the center towards the periphery and the focal distance f of each of the lens elements is also set to vary accordingly between 774 mm and 628 mm.

Concerning the measured values of double imaging in this embodiment, as shown in the drawings, as with Case 4, double imaging does not appear up to 250 mm from the center of Fresnel lens sheet 7 and is hardly ever observed in the displayed image.

Also, by making the focal length at the periphery shorter than at the center, light beams emitted from the periphery of the Fresnel lens sheet 7 are refracted inside the picture even with regards to peripheral luminance, the lowering of which became a problem in case 4 shown previously. Therefore, as shown in the table of the luminance ratio with respect to the center of the screen of FIG. 12, it is possible to obtain a luminance similar to that of conventional Case 3. Up to about 400 mm from the center the luminance in this embodiment is a little less than the luminance in Case 3 but the difference in not discernible by the naked eye and does not affect picture quality.

Figure 13:
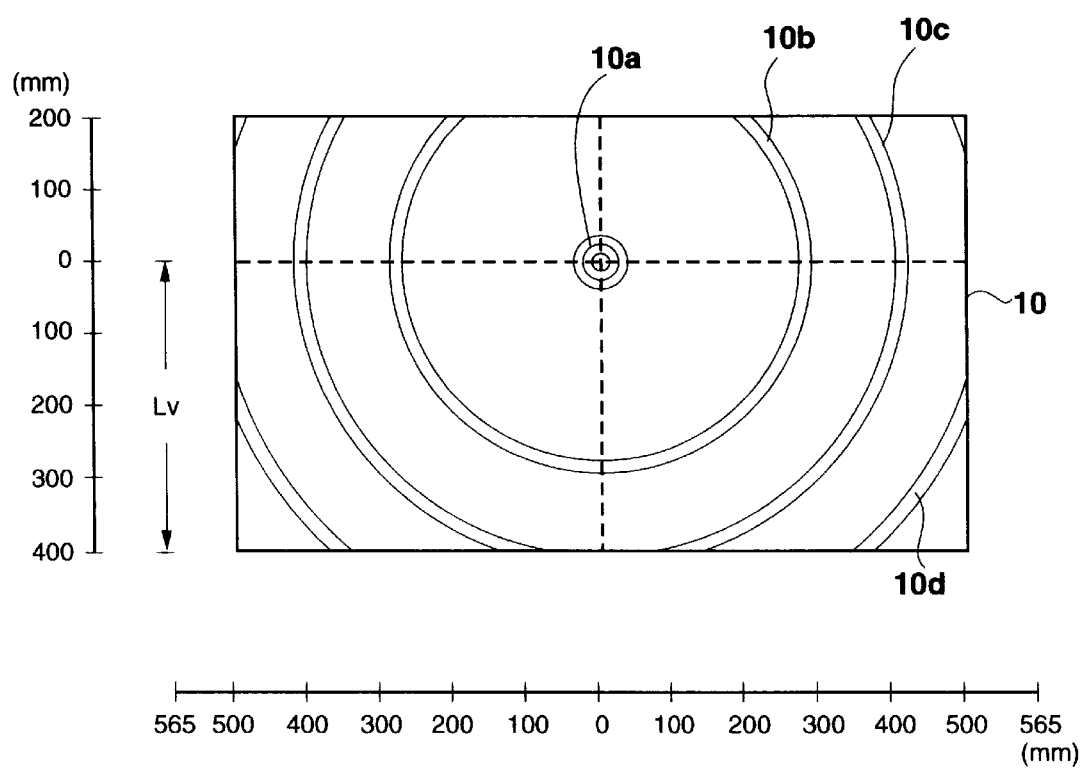
FIG. 13 is a plan view of a Fresnel lens sheet with a vertically offset center.

In the description of the embodiment above, an example has been given where the center of the picture is at the center of the Fresnel lens sheet but recently, consideration is being given to offsetting the center of the Fresnel lens sheet 10 from the center of the picture as shown in FIG. 13, and offsetting the picture to the most suitable viewing position by slanting the optical axis of the optical elements of the display device up or down.

In the case of such a display device, focal lengths from the center of the Fresnel lens sheet 10 to the upper or lower edge of the picture, whichever is the more distal according to the direction in which the center of the picture is offset, that is to say as far as radius Lv, are made constant so that double imaging does not occur, with the outer focal lengths being made gradually shorter. In other words, in FIG. 13, lens elements 10a and 10b to 10c are set to have a constant focal length and lens elements from 10c to 10d . . . which make up the periphery are set to have gradually shorter focal lengths.

Also, the sizes and aspect ratios of Fresnel lens sheets 7 and 10 and, depending on the characteristics of each type of projection system (CRT, liquid crystal panel, etc.), the focal lengths of Fresnel lens sheets 7 and 10 may be set progressively shorter from the centers as shown by the dashed and two-dotted line in FIG. 10.

In this case, by setting the conic constant K=−0.75, optical axis curvature C=−0.00227, A2=0, A3 =0, A4=−3.78×10$^{-21}$, A5=6.93×10$^{-27}$, it was possible to configure the Fresnel lens sheet 10 in the desired shape to achieve the characteristics shown by the dashed and two-dotted line in FIG. 10.

Also, in the description of the above embodiment, the image source is a projector using three CRTs for each of the background colors R, G and B but the present invention is not restricted to this. For example, the present invention can also be applied to a liquid crystal projector device having an optical system with a single projection lens for the enlarged projection of an image optically modulated with three liquid crystal panels corresponding to R, G and B and then composed into a single image, or to an optical system with a single projection lens for enlarged projection of an image optically modulated by a single liquid crystal panel having or not having RGB color filters.

As described above, since the projection-type display device of the present invention enables light projected outwards from within the Fresnel lens sheet which constitutes the transmission screen showing the projection image to be obtained at the periphery to go in the direction of the center by setting the focal length long from the center where double imaging appears almost to the upper or lower edge of the picture and gradually shorter thereafter, even if the projection-type display device is made more compact, reduced picture quality due to double imaging and reduced luminance at the periphery of the Fresnel lens sheet can be suppressed and an improved image can be obtained over the entire picture.

What is claimed is:

1. A projection-type display device comprising:

an image projector for projecting image light rays; and a screen being disposed on a side of said image projector to which said image light rays are projected and including a Fresnel lens sheet with one side thereof facing said image projector and a lenticular sheet disposed on the other side of said Fresnel lens sheet for transmitting said image light rays that are formed into a picture on said screen, wherein said Fresnel lens sheet has a fixed local length in a region extending a predetermined distance from a center of said Fresnel lens sheet and having focal lengths gradually decreasing toward the outer periphery of said Fresnel lens sheet in a region exceeding said predetermined distance.

2. A projection-type display device according to claim 1, wherein said predetermined distance is at least one of a distance from said center of said Fresnel lens sheet to a point corresponding to an upper edge of a projected image on said Fresnel lens sheet and a distance from said center of said Fresnel lens sheet to a point corresponding to a lower edge of said picture on said screen.

3. A projection-type display device according to claim 1, wherein said lenticular sheet includes vertical black stripes formed thereon at prescribed intervals.

4. A projection-type display device comprising:

an image projector for projecting image light rays; and a screen being disposed on a side of said image projector to which said image light rays are projected and including a Fresnel lens sheet with one side thereof facing said image projector and a lenticular sheet disposed on the other side of said Fresnel lens sheet for transmitting said image light rays into a picture on said screen, wherein said Fresnel lens sheet has focal lengths gradually decreasing from a center of said lens sheet toward an outer periphery thereof.

5. A projection-type display device according to claim 4, wherein said lenticular sheet includes vertical black stripes formed thereon at prescribed intervals.

6. A projection apparatus comprising:

a housing;

a screen including a Fresnel lens sheet and a lenticular sheet and being disposed at a front of said housing;

a reflector disposed inside said housing at a rear portion thereof;

an image source; and a projection lens, wherein said Fresnel lens sheet has a fixed focal length in a region extending from a center of said Fresnel lens sheet to a predetermined distance and focal lengths gradually decreasing toward an outer periphery of said Fresnel lens sheet in a region exceeding said predetermined distance.

7. A projection apparatus according to claim 6, wherein said predetermined distance is at least one of a distance from said center of said Fresnel lens sheet to a point corresponding to an upper edge of a projected image on said Fresnel lens sheet and a distance from said center of said Fresnel lens sheet to a point corresponding to a lower edge of said projected image on said Fresnel lens sheet.

8. A projection apparatus according to claim 6, wherein said image source comprises a cathode ray tube.

9. A projection apparatus according to claim 6, wherein said image source comprises three cathode ray tubes respectively corresponding to a red signal, a green signal and a blue signal.

10. A projection apparatus according to claim 6, wherein said image source comprises a liquid crystal panel.

11. A projection apparatus according to claim 6, wherein said image source comprises three liquid crystal panels respectively corresponding to a red signal, a green signal and a blue signal.

12. A projection apparatus according to claim 6, wherein said lenticular sheet includes vertical black stripes formed thereon at prescribed intervals.

13. A projection apparatus comprising:

a housing;

a screen including a Fresnel lens sheet and a lenticular sheet and being disposed at a front of said housing;

a reflector disposed inside said housing at a rear portion thereof;

an image source; and a projection lens, wherein said Fresnel lens sheet has focal lengths gradually decreasing from a center of said lens sheet toward an outer periphery thereof.

14. A projection apparatus according to claim 13, wherein said image source comprises a cathode ray tube.

15. A projection apparatus according to claim 13, wherein said image source comprises three cathode ray tube respectively corresponding to a red signal, a green signal and a blue signal.

16. A projection apparatus according to claim 13, wherein said image source comprises a liquid crystal panel.

17. A projection apparatus according to claim 13, wherein said image source comprises three liquid crystal panels respectively corresponding to a red signal, a green signal and a blue signal.

18. A projection apparatus according to claim 13, wherein said lenticular sheet includes vertical black stripes formed thereon at prescribed intervals.

* * * * *